July 24, 1962　　　　A. SIMON　　　　3,045,806
EQUIPMENT FOR MOVING FROM ONE LEVEL TO ANOTHER THE
UNITS OF AUTOMATIC CONVEYOR TABLES
Filed Oct. 16, 1959　　　　　　　　　　　　5 Sheets-Sheet 1
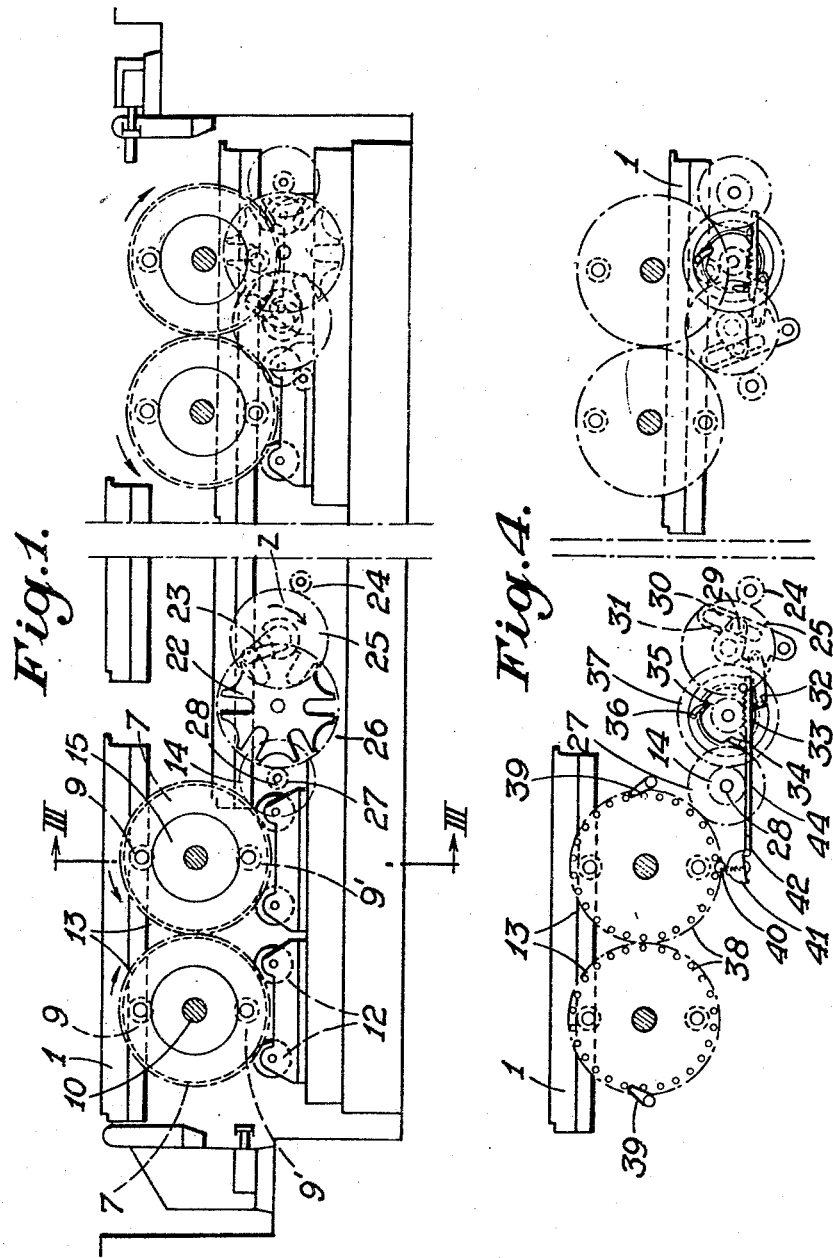
Inventor
A. Simon
By Glascock Downing Seebold
Attys.

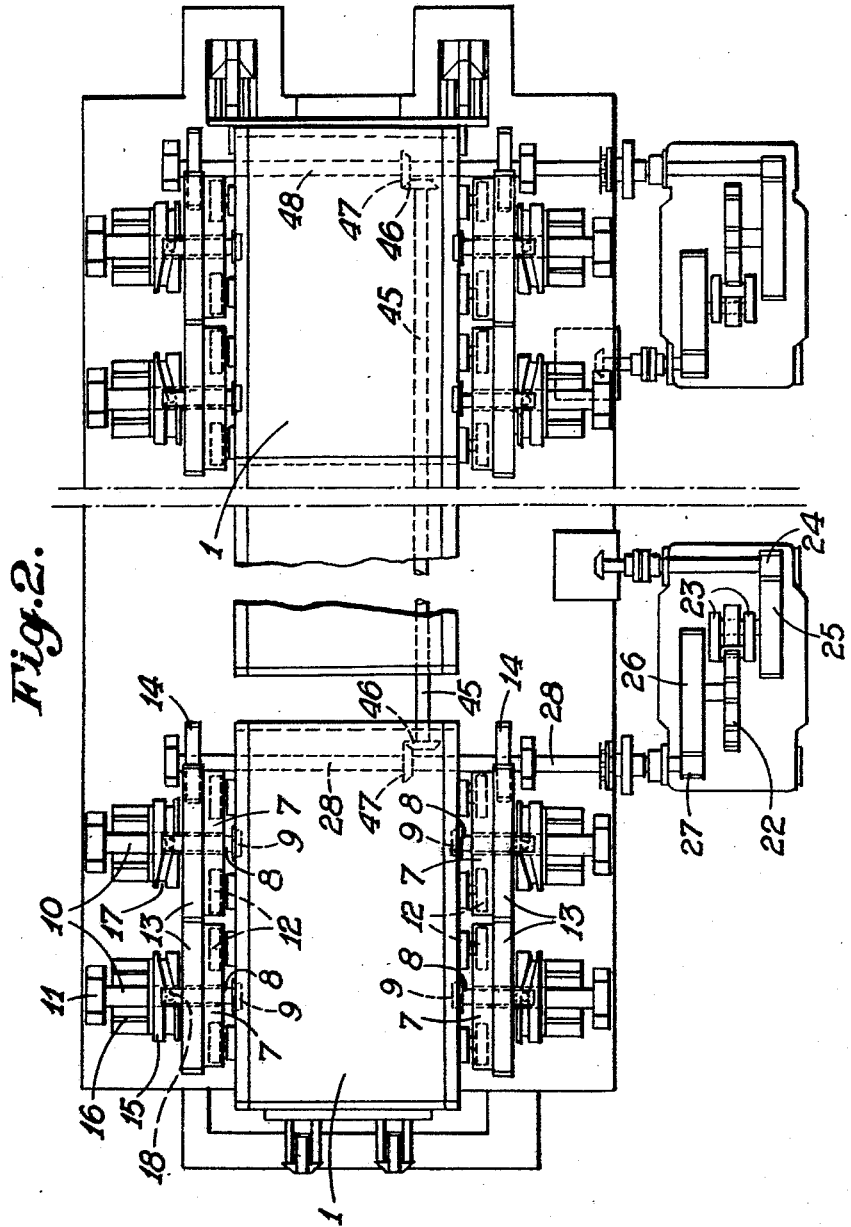

July 24, 1962 A. SIMON 3,045,806
EQUIPMENT FOR MOVING FROM ONE LEVEL TO ANOTHER THE
UNITS OF AUTOMATIC CONVEYOR TABLES
Filed Oct. 16, 1959 5 Sheets-Sheet 3
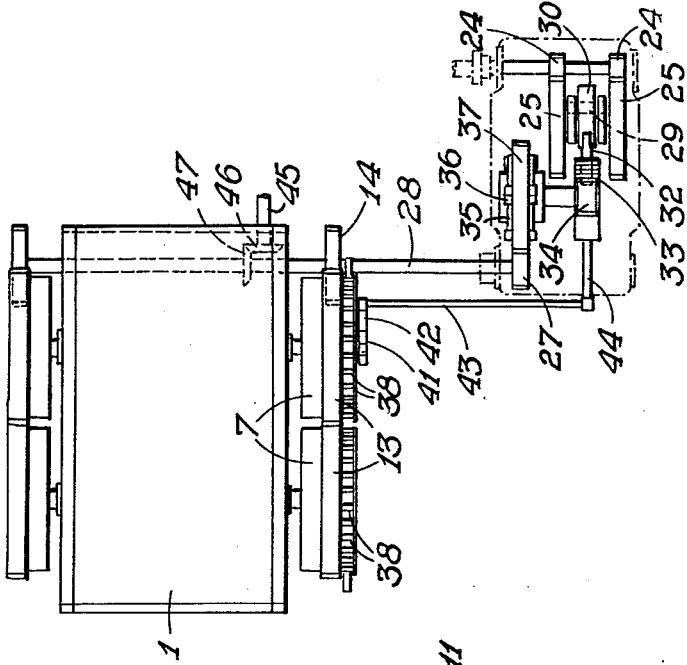
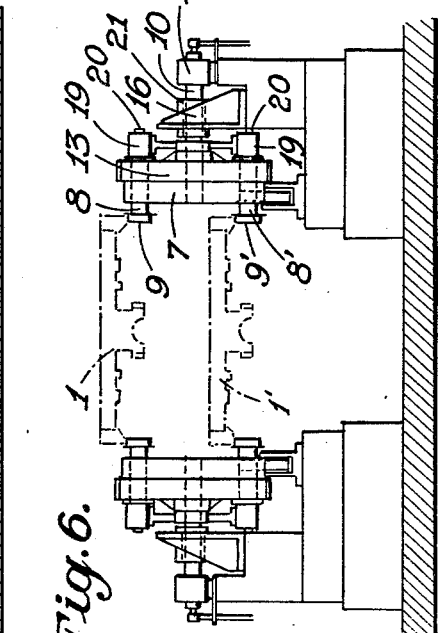
Inventor
A. Simon
By Glascock Downing Seebold
Attys

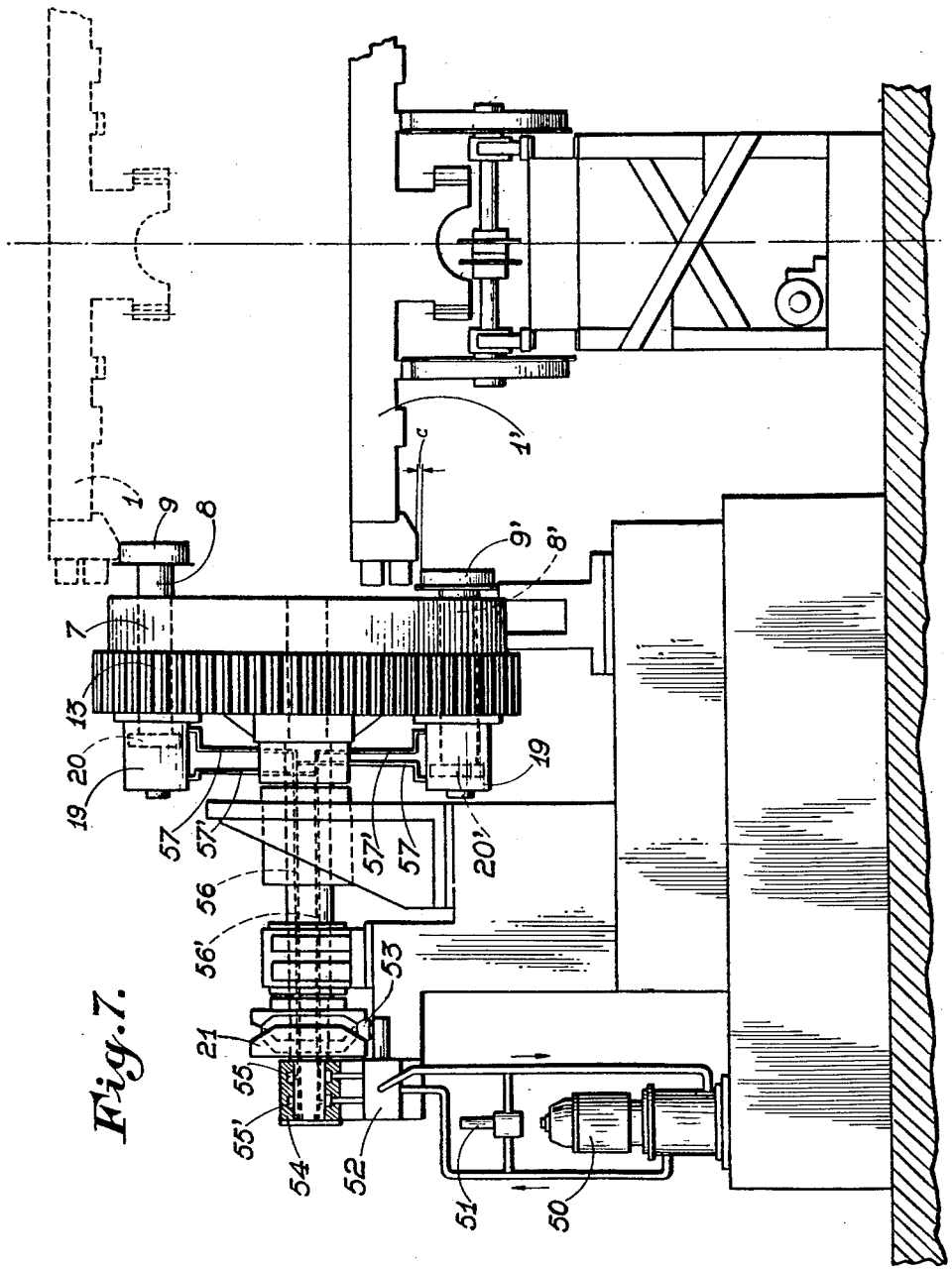

July 24, 1962  A. SIMON  3,045,806
EQUIPMENT FOR MOVING FROM ONE LEVEL TO ANOTHER THE
UNITS OF AUTOMATIC CONVEYOR TABLES
Filed Oct. 16, 1959  5 Sheets-Sheet 5
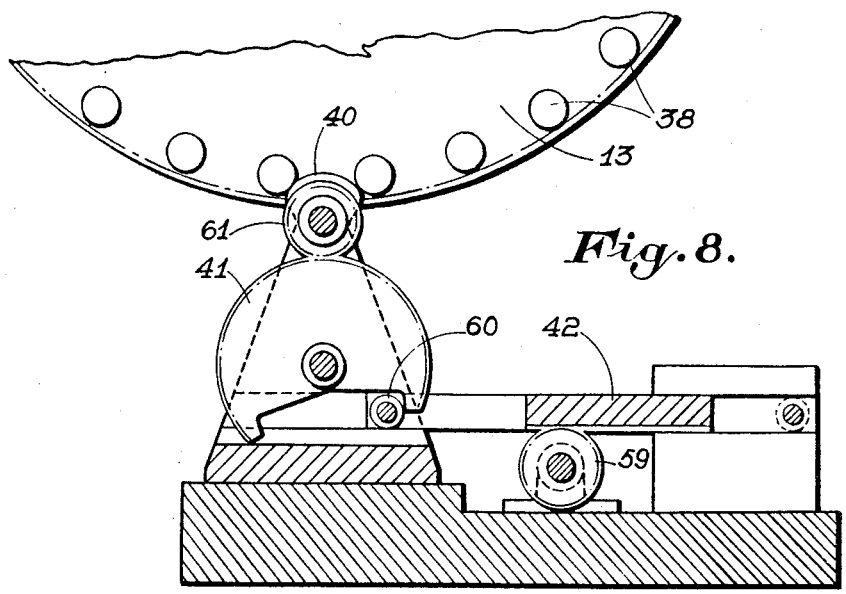
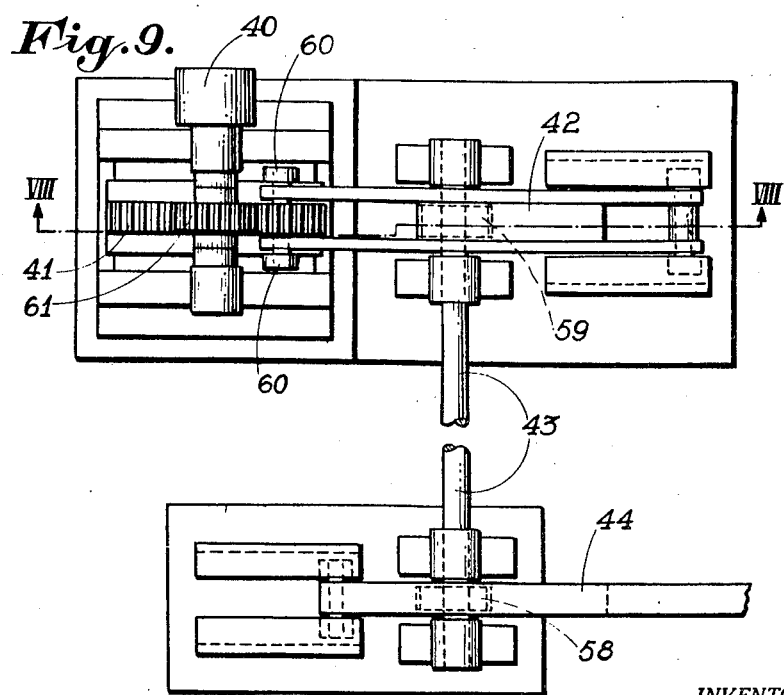
INVENTOR.
A. Simon 3,045,806
EQUIPMENT FOR MOVING FROM ONE LEVEL TO ANOTHER THE UNITS OF AUTOMATIC CONVEYOR TABLES
André Simon, Temploux, Belgium, assignor to Ateliers Heuze, Malevez et Simon Reunis, Societe Anonyme, Auvelais, Belgium, a Belgian company
Filed Oct. 16, 1959, Ser. No. 846,853
Claims priority, application Belgium Dec. 15, 1958
8 Claims. (Cl. 198—85)

The invention is in respect of a piece of equipment for moving from one level to another the units forming the working table of automatic conveyors which feed forward either non-stop or intermittently from one end of the installation to the other. This equipment can be used for example to lower successively to the lower level the table units which have come to the end of the conveyor at the working level which, more often than not is the upper level, and to raise them up again to the working level at the other end of the conveyor. In other cases the equipment as per the invention is designed to enable the level of the working table to be adapted to whatever arrangements are possible with regard to the tooling for processing the objects which are being moved along on the table of the conveyor.

Moving the table units from one level to another has to be carried out at a fixed rate governed by the rate at which the units are fed forward at the working level. This rate should include, alternating with each other, working cycles, involving movement, during which the units are transferred from one level to another, and non-working cycles during which the units are taken into a transfer mechanism and removed from the latter after the movement has been executed. Generally speaking, it is advisable to choose working cycles shorter than the non-working cycles, though the reduction of the working cycle is limited by the necessity of having, during the latter, a stepless acceleration and deceleration of the masses being shifted with a view to preventing any jarring which would otherwise cause the installation to wear out quickly.

The equipment in accordance with the invention presents the advantage that the table units are shifted rapidly from one level to another whilst at the same time allowing for the units to be set in motion and stopped gradually.

To this end, the equipment has, essentially, sets of four synchronized cranks, mounted in two parallel planes of rotation and along two parallel axes, carrying on the crank pins, pointing towards opposite planes of rotation, rollers whose job is to support a table unit which has to be shifted on to the other level by a half-turn rotation of the cranks which are operated by a mechanism transmitting to them alternately, a working cycle of rotation and a non-working cycle during which the table units which are being moved are taken on to the rollers or withdrawn from them.

The cranks referred to are crank-plates formed of four discs turning about their centres in two parallel vertical planes, the discs located in one particular plane being cleated one to the other by toothed wheels integral with the discs and in mesh with each other.

It is of advantage for the equipment as per the invention to have two sets of four cranks, of which those in one set are diametrically opposite those of the other, each crank being equipped with an axially sliding crank pin operated by a mechanism which causes the crank pins to withdraw from the particular set of cranks whose rollers do not happen to be under load in order to give free passage to the table unit during the time the latter, supported by the rollers of the other set of cranks, is in movement between the discs, in such a way as to enable the rollers of one set of cranks, during the same non-working cycle of the discs, to take on a table unit for transference to the other level, and to take from the rollers of the other set of cranks the table unit which had been transferred during the previous working cycle.

The mechanism for driving the discs and transmitting an intermittent movement thereto, may comprise a Maltese cross acting, through the intermediary of a train of gears, on a coaxial pair of the four discs. The stepless action of the Maltese cross control combines with the stepless acceleration and deceleration movements of the table units placed on the cranks' rollers, thus causing the installation to run very smoothly.

However, the stepless manner in which the table units are propelled by the crank-operated system is in itself sufficient to justify using driving mechanisms which have a more immediate action. Thus, this mechanism may advantageously comprise a slide beam connected, by a connecting rod, to a rack which, sliding longitudinally to and fro, acts on a coaxial pair of the four discs through the intermediary of a train of gears in which is intercalated a free wheel which is driven, during one of the angular decrements of the crank actuating the slide beam, and not driven during the other angular decrement of this crank, a cycle in fact during which the four discs are prevented from executing any undesirable backward or forward movement, by retainer components provided for this very purpose. These components may for example comprise cogs fixed on two of the four discs which are in mutual mesh, and pawls catching in the cogs. By making the period during which the free wheel is driven coincide with the small angular decrement, the working cycle of rotation of the cranks which propel the table units is shorter than the non-working cycle and it is an easy matter to limit the working cycle to a third of the time available for the complete manipulation of a table unit, and to reserve two thirds of this time for the non-working cycle during which the table units are engaged in the transfer equipment or disengaged therefrom.

In order, when a drive mechanism comprising a slide beam is used, to ensure that the rollers supporting the table units are placed in position in an invariable manner so as to render them stable for the whole time these units are engaged and disengaged, it may be worthwhile to provide components for wedging the four discs tight during the entire non-working cycle. It is as well for these components to include a bolt which is held back between two cogs during the non-working cycle, a rocker cam actuating the bolt, and a rod actuating the cam, this rod being integral with the rack actuated by the slide beam.

The mechanism operating the axial slide motion of the crank pins comprises fixed circular cams fitted coaxially at the side of the rotary discs with which the sets of cranks are integral, these cams being provided with a curved circumferential grooving into which a pin engages which is fitted in the shafts constituting the sliding crank pins.

According to another form of execution of the invention, this mechanism includes a system of cylinders and pistons actuated by a pressurized fluid the periodic intake of which is regulated for example by a cam, the cylinders being mounted on the rotary discs and the pistons mounted axially on the shafts constituting the sliding crank pins.

When the equipment as described is applied, pair-wise, to conveyors having two levels at which the table units are propelled, one of the pieces of equipment serving for instance as lifting gear at the incoming end of the conveyor in order to lift up to the higher level the table units coming in at the lower level from the outgoing end of the conveyor, and the other piece of equipment then serving as lowering gear at the outgoing end of the conveyor for the purpose of bringing down to the lower level the oncoming table units as they reach the terminus of the upper level, the two pieces of equipment are advantageously connected together by a flexible shaft in order to equilibrate the effect of their loads on the operating mechanism.

The invention will now be further described with reference to the accompanying drawings which illustrate several forms of execution presented as examples, and in which:

FIG. 1 is a simplified longitudinal section of the ends of a two-level feed-motion conveyor for the propulsion of table units;

FIG. 2 is a plan view of the above, and

FIG. 3 is a section along line III—III in FIGURE 1;

FIG. 4 shows a simplified section view of an end of a conveyor powered by a different mechanism;

FIG. 5 is a plan view of the above;

FIG. 6 is a section taken at the position of the line III—III of FIGURE 1, of a piece of equipment having a modified control of the sliding crank pins.

FIGURE 7 is a fragmentary elevation, partly in section, of the left hand side of the device as shown in FIGURE 6.

FIGURE 8 is a fragmentary elevation partly in section on line VIII—VIII of FIG. 9 showing a specific embodiment of elements 40, 41, 42 and associated parts shown diagrammatically in FIGURE 4.

FIGURE 9 is a fragmentary plan view of a portion of FIGURE 5 including the structure shown in FIG. 8.

In a conveyor selected for the purpose of example, the table units 1 (FIG. 3), resting with their ribs 2 on the rails 3, are slide propelled along the upper rail, driven by pinions 4 meshing with the racks 5. The return travel of the units to their point of departure is effected at the lower level, for example by running on smooth or cog-rimmed driven wheels 6. It is obvious that the table units can be made to move forward in any other manner depending on the purpose for which the conveyor is being used and the load which the table has to bear, the invention actually only being concerned with the equipment for causing the table units to move from one level to the other.

These pieces of equipment include two sets of four cranks incorporated in the four discs 7. Each of these discs carries, spaced apart by 180 degrees, a crank pin 8 of the one set of cranks and a crank pin 8' of the other set, each equipped with a roller 9 or 9' supporting the table units 1 at their edges. The discs 7 are keyed on to a shaft end 10 turning in a bearing 11 and they bear on a pair of rollers 12. Each of them is integral with a coaxial toothed wheel 13 which meshes with the adjacent wheel 13 of the disc located in the same plane, so that the drive received by two wheels 13 located on the same axis by a pair of pinions 14 ensures the synchronous rotation of the four discs 7.

Since the movement of a table unit 1 brought up by the rollers 9 is effected by a half-turn rotation of the discs 7, the crank pins 8' with their non-loaded rollers 9' have to move out of the way in order to allow the table unit to pass. In order for this to take place, the crank pins perform an axial sliding movement controlled by a suitable mechanism. According to the mode of execution as represented in FIG. 3, this mechanism comprises a fixed circular cam 15 mounted on the bracket 16 and having a circumferential grooving 17 in which the spindle 18, fitted into the shaft 8 constituting the crank pin, engages. Thus, this mechanism causes the crank pin 8 for example, to move out of the way, with the rollers 9, while the table unit 1'—resting with its edges on the rollers 9'—is brought from the lower level up to the upper level by a half-turn rotation of the discs 7, obviously of course after the unit 1, visible in FIG. 3, which had been brought up during the preceding movement, has been moved by horizontal propulsion.

Before the crank 23 rotating in the direction of the arrow Z begins to transmit to the Maltese cross or Geneva movement 22 a rotation movement, a table unit 1' (see FIG. 3) has been brought by the lower track of the horizontal conveyor on the rollers 9' of the crank pins 8' of the discs 7 equipped with toothed wheels 13 (lifting gear shown at the left of FIG. 1) while the table unit 1, which has been previously brought up by the rollers 9 of the crank pins 8 of the discs 7 equipped with toothed wheels 13 to the level of the upper track of the horizontal conveyor, has been moved by said conveyor on a distance equal to the length of a table unit to the right (starting from the lifting gear shown at the left of FIG. 1).

At the same time, the lower track of the horizontal conveyor has moved to the left, the table unit which had been lowered by the lowering gear (shown at the right of FIG. 1) while the upper track of the horizontal conveyor has brought one table unit on the upper rollers 9 of said lowering gear (shown at the right of FIG. 1).

At this time, the horizontal conveyor is stopped by the fact that its drive, which may be identical to the drive 22, 23, 27, 28 of the lifting gear, is in the stoppage position shown at the left of FIG. 1 for the drive 22, 23, 27, 28 and the crank 23 transmits to the Maltese cross 22 a rotation movement which causes the lifting of the table unit 1' (see FIG. 3) to the level of the upper track of the horizontal conveyor.

The same operations are performed in the case of the lowering gear (right of FIG. 1), but in opposite direction, i.e., the table unit is lowered to the level of the lower track of the horizontal conveyor.

During those simultaneous movements of lifting and lowering the considered table units, the crank pins 8 (with rollers 9) of the lifting gear are moved aside to give a free passage for the table unit being lifted on the rollers 9' of the crank pins 8'; the same step occurs, but in the opposite direction, in the case of the lowering gear of the right of FIG. 1.

According to the mode of execution as represented in FIG. 6, the sliding action of the crank pins 8 is controlled by a mechanism which comprises cylinders 19 mounted on the wheels 13 and pistons 20 fitted axially on the shafts which constitute the crank pins, and operated by means of a pressurized fluid, the intake of which is governed by a system of cams 21 integral with the shaft 10 working in conjunction with the bracket 16.

An electric pump 50 provides the necessary hydraulic pressure. A slide-valve 51 (by-pass) prevents any overpressure. One pump can be used to feed simultaneously the four distributors 54.

Clamped on the shaft 10, the cam 21 rotates together with the disc 7 and acts at the required time on the slide valve 52 through the intermediary of a roller 53.

The fluid under pressure flows through the distributor 54 by way of the grooves 55 and 55', the two long holes 56 and 56' drilled in the shaft 10 and the tubes 57 and 57' and reaches the cylinders 19 or the flow therefrom in order to provide the sliding away movement of the crank pins 8 and 8' and of their rollers 9 and 9'.

The operation of the device is as follows:

When the rotation movement of disc 7 begins, the cam 21 acts on the slide valve 52 and the fluid under pressure flows through groove 55, the long hole 56 and both tubes 57 to reach the cylinders 19.

This results in that piston 20 slides to the left to move aside the roller 9, whereas piston 20' slides to the right to make roller 9' project and to place it under the table unit 1'.

The return of the hydraulic fluid to the tank of the pump is performed through tubes 57', the long hole 56', groove 55' and slide valve 52.

By leaving a sufficient clearance between the table unit 1' in the lifting gear and the top of roller 9', the required decrement to perform the moving aside to the right of the crank pin 8' with its roller 9' is obtained.

The moving aside of the crank pin 8' with its roller 9' does not involve any difficulty as the table unit 1 of the upper track has already left the lifting gear (being moved to the right by the horizontal conveyor).

As regards the lowering gear, the operation is the same and at the end of the rotation movement of the disc 7 the roller 9 slides to the right to receive the table unit 1 coming from the horizontal conveyor, whereas the roller 9' moves aside by sliding to the left.

The mechanism driving the discs 7 has to transform a non-stop rotary movement at the input end of a gear train into an intermittent movement at the output end, comprising a working cycle of rotation and a non-working cycle.

In accordance with FIGURES 1 and 2, this gear train comprises a Maltese cross or Geneva movement 22 actuated by the crank 23 controlled by the pinion 24 with the aid of the speed reduction gear 25. The Maltese cross, integral with a speed-multiplying gear 26 meshing with the pinion 27 keyed on the shaft 28 on which the pinions 14 are located, puts the toothed wheels 13 into intermittent movement.

In the variant as represented in FIGURES 4 and 5, the two wheels 25, driven in continuous rotation by the pinions 24, actuate the crank 29 of a rocker 30 with slide 31 on which is articulated an arm 32 transmitting to the rack 33 a to-and-fro movement which is passed on to the pinion 34. This pinion transmits its alternating rotary motion to the wheel 35 equipped with notches into which the pawls 36 of a free wheel 37 engage which meshes with the pinion 27 keyed on the shaft 28 carrying the pinions 14 which engage the toothed wheels 13. The working cycle corresponds to the driving of the free wheel by the engagement of the pawls in the notches, this enabling it to be made of shorter duration than the non-working cycle, causing the working cycle to coincide with the small angular decrement of the crank 29.

According to this embodiment, the drives including a Maltese cross (22, 23, 27, 28), those of the lifting and lowering gears as well as the one of the horizontal conveyor, are each replaced by a driving mechanism comprising a rocker 30 with slide 31 actuated by a crank 29 and actuating through the intermediary of a rack 33, the free wheel 37 and pawls 36 transmission.

With such a driving mechanism the lifting phase of the lifting gear (left of FIG. 4), the lowering phase of the lowering gear (right of FIG. 4) and the movement phase of the horizontal conveyor are caused by the small angular decrement of crank 29, i.e., during the time when said crank follows the part of its travel which is the nearest to the pivotment center of the rocker 30 in such a manner that these so-called "active" phases of the devices are performed with an accelerated motion while the corresponding "inactive" phases are performed when crank 29 follows the part of its travel which is the remotest from the pivotment center of the rocket 30 and are thus longer.

It is to be understood that like for the device according to FIGS. 1 and 2, to a lifting phase of the lifting gear and to a lowering phase of the lowering gear corresponds an inactive phase of the horizontal conveyor and vice-versa.

During the backward movement of the rack 33 the wheel 37 is free and, consequently, the discs 7 are neither driven nor held back. In order to render impossible any rotary movement by these discs, two toothed wheels 13 in mesh, are equipped with crown cogs 38 in which the pawls 39 catch, and, for the purpose of wedging the discs secure, there is a roller 40 engaging between two cogs under the thrust of a pivot cam 41 actuated by the push-rod 42 which is mounted, via the arm 43, on the extension 44 of the rack 33.

At the end of the rack, the extension 44 is toothed in order to mesh with a pinion 58 which transmits its rotation movement to a pinion 59 through the intermediary of the arm or shaft 43.

During the "inactive" period, the push-rod 42 is moved from the right to the left under cam 41.

Near the end of the movement of the "inactive" period, the roller 60 of the push-rod 42, in bearing on the slope of the cam 41 rotates said cam in a clockwise direction.

Cam 41 which forms a toothed sector rotates pinion 61 clamped on the shaft of the shaped roller 40 which is unlocked in order to permit the rotation movement of discs 7 during the active period.

During the active period the roller 60 of the push-rod 42 travels from the left to the right to lock the discs 7 at the end of said active period.

The locking and unlocking steps are carried out by coupling and uncoupling of the roller 40 with two crown cogs 38.

The feed motion of the table units 11 to bring them on to the rollers 9 with a view to moving them from one level of the conveyor to the other, or to withdrawing them from the rollers 9 after they have been moved, is effected in familiar fashion by an intermittent-movement mechanism, the working cycle of which takes effect during the non-working cycle of the mechanism controlling the intermittent movement of the discs 7.

In FIGURE 7 an electric pump 50 provides the necessary hydraulic pressure. A slide-valve 51 (by-pass) prevents any overpressure. (One pump can be used to feed simultaneously the four distributors 54.) Clamped on the shaft 10, the cam 21 rotates together with the disc 7 and acts at the required time on the side valve 52 through the intermediary of a roller 53. The fluid under pressure flows through the distributor 54 via the grooves 55 and 55', the two long holes 56 and 56' drilled in the shaft 10 and the tubes 57 and 57' and reaches the cylinders 19 or flows therefrom in order to provide the sliding away movement of the crank pins 8 and 8' and of their rollers 9 and 9'. The operation of the device is as follows:

When the rotation movement of disc 7 begins, the cam 21 acts on the slide valve 52 and the fluid under pressure flows through groove 55, the long hole 56 and both tubes 57 to reach the cylinders 19. This results in that piston 20 slides to the left to move aside the roller 9, whereas piston 20' slides to the right to make roller 9' project and to place it under the table unit 1'. The return of the hydraulic fluid to the tank of the pump is performed through tubes 57, the long hole 56', groove 55' and slide valve 52.

By leaving a sufficient clearance c between the table unit 1' in the lifting gear and the top of roller 9', the required decrement to perform the moving aside to the right of the crank pin 8' with its roller 9' is obtained. The moving aside of the crank pin 8' with its roller 9' does not involve any difficulty as the table unit 1 of the upper track has already left the lifting gear (being moved to the right by the horizontal conveyor).

As regards the lowering gear, the operation is the same and at the end of the rotation movement of the disc 7, the roller 9 slides to the right to receive the table unit 1 coming from the horizontal conveyor whereas the roller 9' moves aside by sliding to the left.

With respect to FIGURES 8 and 9, it will be noted that at the end of the rack the extension 44 is toothed in order to mesh with a pinion 58 which transmits its rotation movement to a pinion 59 through the intermediary of the arm (or shaft) 43.

During the "inactive" period, the push-rod 42 is moved from the right to the left under the cam 41. Near the end of the movement of the "inactive" period, the roller 60 of the push-rod 42, in bearing on the slope of the cam 41, rotates said cam in a clockwise direction. Cam 41, which forms a toothed sector, rotates pinion 61 clamped on the shaft of the shaped roller 40 which is unlocked in order to permit the rotation movement of discs 7 during the active period.

During the active period the roller 60 of the push-rod 42 travels from the left to the right to lock the discs 7 at the end of said active period. The unlocking and locking steps are carried out by uncoupling and coupling of the roller 40 with the two crown cogs 38.

Two pieces of equipment such as have been described, which are located at the two ends of a two-level conveyor for feeding forward table units, of which the first piece of the equipment serves as lifting gear and the second as lowering gear, are connected together by a flexible shaft 45 (FIGURES 2 and 5) carrying cones 46 meshing with the pinions 47 keyed on the shafts 28, the effect of this being to equalize the loadings of the mechanisms driving the two pieces of equipment.

Obviously, the invention is not limited to the forms of execution which have been described and represented by way of examples and the fact that these may be made the subject of modifications does not imply a departure from the framework of the invention.

I claim:

1. Equipment for moving feed table units of a substantially horizontal automatic conveyor from one level to another, comprising two opposed sets of cranks at each end of the conveyor, each set of cranks including two discs disposed at each side of the corresponding end of the conveyor, the discs of each set being coupled one to the other so as to rotate in opposite directions at the same speed in a substantially vertical plane parallel to the axis of the conveyor, the rotational movement of the discs being synchronized, each disc being equipped with a support crank pin mounted to slide axially between retracted and extended position in the disc parallel to the axis of rotation, a driving mechanism causing one crank pin on each disc to move axially into retracted position in the disc as it rotates so as to give free passage to a table unit supported by the other said crank pins, and to bring said first-mentioned crank pins into extended position after the passage of the table unit upon further rotation of said discs, and a driving mechanism transmitting to the crank sets working cycles of successive half turns.

2. Equipment as claimed in claim 1, characterised in that the mechanism which transmits to the cranks alternately a working cycle of rotation of half a turn and a non-working cycle of half a turn, includes a Geneva movement acting through the intermediary of a gear train on a coaxial pair of the four discs.

3. Equipment as claimed in claim 1, characterised in that the mechanism which transmits to the cranks alternately an active, half-turn rotation, cycle and a non-working half turn cycle includes a slide beam connected by a rod to a rack sliding longitudinally alternately to and fro, acting on a coaxial pair of the four discs through the intermediary of a free wheel which is driven during one of the angular decrements of the crank actuating the slide beam and is not driven during the other angular decrement of this crank, a period during which the four discs are prevented from executing any undesirable backward or forward movement by retainer components provided for this purpose.

4. Equipment as claimed in claim 1, characterised in that the mechanism controlling the axial slide of the crank-pins includes fixed circular cams fitted coaxially beside discs with which the sets of cranks are integral, said cams having a curved circumferential grooving in which a spindle engages which is fitted in the shafts constituting the sliding crank-pins.

5. Equipment as claimed in claim 1, characterised in that the mechanism controlling the axial slide of the crank-pins is formed of a system of cylinders and pistons actuated by a fluid under pressure, the periodic intake of which is regulated for example by means of a cam, the cylinders being mounted on the rotary discs and the pistons being mounted axially on the shafts constituting the sliding crank-pins.

6. Equipment as claimed in claim 3, in which the retainer components include cogs fixed on two of the four discs which are in mutual mesh, and pawls catching in these cogs.

7. Equipment as claimed in claim 3, including components for locking the four discs during the non-working period of the mechanism driving these discs.

8. Equipment as claimed in claim 7, characterised in that the disc-locking components include a bolt which is held between two cogs during the non-working period, a rocker cam controlling the bolt, and a rod actuating the cam, said rod being integral with the rack moved by the slide beam.

References Cited in the file of this patent
UNITED STATES PATENTS

| | | |
|---|---|---|
| 1,703,637 | Reifsnyder | Feb. 26, 1929 |
| 2,493,857 | Cargill | Jan. 10, 1950 |

FOREIGN PATENTS

| | | |
|---|---|---|
| 580,192 | Canada | July 28, 1959 |